May 29, 1945. H. R. MATSON 2,376,931
TOOL SHANK REPAIR PROCESSES AND REPAIR PRODUCT
Filed Sept. 7, 1942

INVENTOR
H. RICHARD MATSON
BY
Wheeler, Wheeler & Wheeler
ATTORNEYS.

Patented May 29, 1945

2,376,931

UNITED STATES PATENT OFFICE 2,376,931

TOOL SHANK REPAIR PROCESS AND REPAIR PRODUCT

H. Richard Matson, Milwaukee, Wis.

Application September 7, 1942, Serial No. 457,575

1 Claim. (Cl. 76—108)

My invention relates to improvements in tool shank repair processes and repair product.

The object of my invention is to provide improvements in the process of repairing tools, the shanks or tangs of which have broken.

More particularly stated, it is an object of my invention to so weld a broken tool shank or tang as to reconstitute it as a virtually perfect usable tool, adequate in strength and true as to alignment and dimensions.

In the drawing.

Like parts are identified by the same reference characters throughout the several views.

Figure 1:
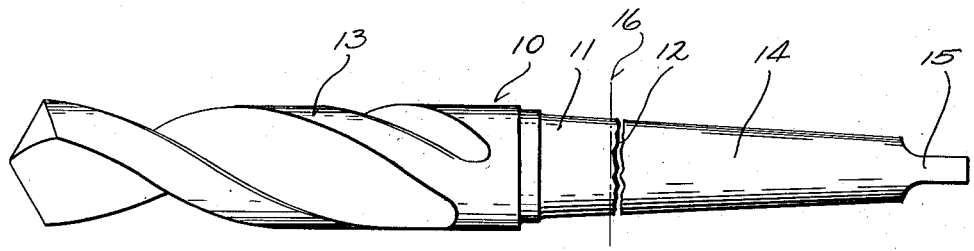
Figure 1 shows a drill with a broken tapered shank.

At present, despite such attempts as represented by the disclosure in U. S. Letters Patent No. 1,867,345, issued July 12, 1932 to O. E. Andrus, and despite efforts including the use of silver as a welding repair medium, the fact remains that high speed drills and other tools having shanks for attachment or insertion thereof in operating machinery, such as drill presses and lathes, must be discarded and represent a total loss if the shanks or tangs of such tools are broken.

Modern high speed tools have characteristics of metal structure preventing the use of electric welding methods taught by the Andrus patent referred to above, since the electric welding process necessitates the elevating of temperatures in the metal of the shank above the critical range, which changes the grain structure of the metal adjacent to the weld, causing what is known as a transition zone, in which the metal is very hard and has no ductility. In use it will be found that the metal will break in this zone. Gas welding, using a steel wire for filler metal, will have the same effect, although not so pronounced. On the other hand, silver, when used as a welding medium by any method—or gas torch welding—not only leaves the repaired tool subject to distortion and misalignment, but also inadequate as to strength for even ordinary stresses.

My process therefore will be seen to meet the problems above set forth and to meet the inadequacies of previous attempts to solve the problem.

In the description hereinafter set forth I shall use as an illustration of the use of my process the repair of a high speed drill 10, the shank 11 of which has been broken at 12 so as to leave a stub connected to the drill bit 13, and a tapered shank 14 and tang 15 which in my process are discarded. It will be understood that the same process is applied to other tools, whether or not they are of high-speed steel.

Figure 2:
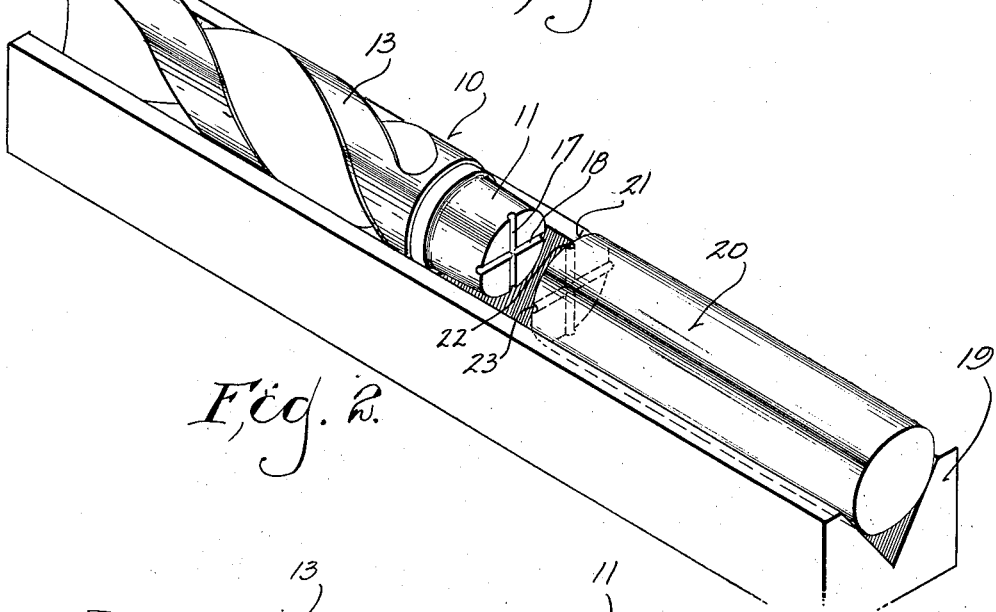
Figure 2 is a perspective of a drill in an ordinary V fixture, with its broken shank stub disposed opposite a repair stock preparatory to a welding operation.

The first step in my process is to squarely cut off the stub 11 along the line 16 (see Figure 1), thus providing a bit 12 with squarely cut-off stub shank 11, as shown in Figure 2. The face of the end of the stub shank 11 is grooved at 17 and 18. Placing the bit 13 in the groove of a V fixture 19, I place opposite the stub 11 and in alignment with the axis of the bit 13 a suitable length of round rod stock 20 of radial dimension approximately the same as the diameter of the bit 13, and therefore somewhat larger than the diameter of the stub 11. This stock is of the characteristic known in the trade as SAE 1045 or SAE 4130. Steels that possess the necessary hardness and toughness required for this type of application are readily machinable. The end 21 of the stock 20 is grooved similarly to grooves 17 and 18, as shown at 22 and 23. The meeting faces of the stock 20 and the stub 11 are then brought in approximation in readiness for welding operation by a gas torch welding method. Suitable flux is, of course, used, and I prefer to use a type of weld rod known in the trade as "Castoline No. 16," but the important characteristics of any weld rod or welding medium to be used is that it shall flow at a temperature well below the critical range of the high speed steel of which the bit 13 is made. Such high speed steels undergo a change in grain structure at 1400° F. which in turn destroys the desirable qualities of high speed steel, namely, toughness and hardness.

Having juxtaposed the surfaces of the stub 11 and the stock 20 with the grooves mated and proper flux between the surfaces, I carry on a gas torch welding operation with a welding rod or welding medium, such as the Castoline above refered to, and I fill the grooves 17—22 and 18—23 with such relatively low temperature medium. I also, of course, join the abutting end surfaces of the stock 20 and stub 11, as shown in Figure 3.

Figure 3:
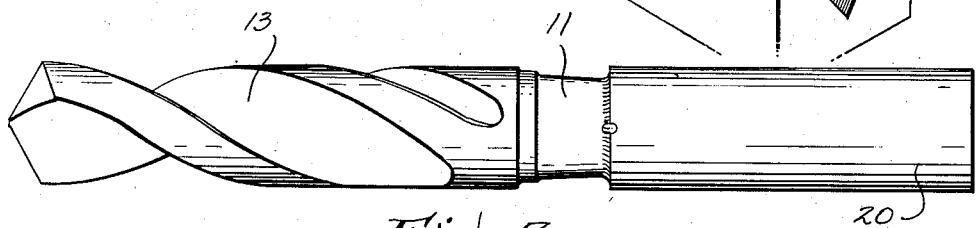
Figure 3 is a view of the drill and stub shank shown in Figure 1, but with the repair stock welded in position in readiness for final machining operations in my process.
Figure 4:
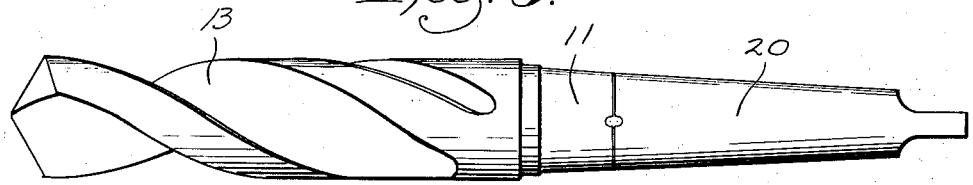
Figure 4 is a view similar to Figure 1, but with the shank of the drill repaired in readiness for use.

Only rough approximation as to trueness of the axis of stock 20 with the axis of the bit 13 is necessary in the cooled intermediate product shown in Figure 3, for I then am prepared to machine excess material from the stock 20 to bring the repaired tool to accurate alignment and dimensions, as shown in Figure 4. Ordinary machining and grinding processes are used in removing the excess stock from the material product shown in Figure 3 to make the completed repaired tool as shown in Figure 4. Usual shop technique is all that is necessary to obtain an accurate repaired product.

The welding medium flowed into the mated grooves constitutes keys which aid materially in taking mechanical stresses incident to the torsional rotation of the drill bit after it has been placed in use.

I thus carry on a new process in which my features are the provision of a gas torch welding of a repair stock 20 upon a truly faced stub 11, using weld rod or welding medium of such characteristics as Castoline No. 16 with a welding temperature of approximately 1200 to 1300 degrees F., the machining of the intermediate product shown in Figure 3 to the finished repaired product shown in Figure 4, and in some instances the provision of keys of welding medium in grooves upon the juxtaposed faces of the stub 11 and stock 20 to add strength to the completed product.

I claim:

The process of repairing broken rotatable tool shanks including facing the stub and a piece of replacement stock of readily machinable steel adapted to be substituted for the outer end of the tool shank, providing both of the faced ends with registerable grooves, adjusting said stock to the tool shank stub with the grooves in registry, filling the grooves with weld rod material having a melting point of approximately 1200 to 1300 degrees F. and applying a suitable flux to the joint, heating the butted surfaces and said weld rod to a fusing temperature sufficiently below 1400 degrees F. to avoid material impairment of its grain structure and then machining said stock to the dimensions of the outer end portion of the broken tool shank.

H. RICHARD MATSON.